April 13, 1943.        J. F. WILHELM        2,316,377
TANK GAUGE
Filed Oct. 10, 1940
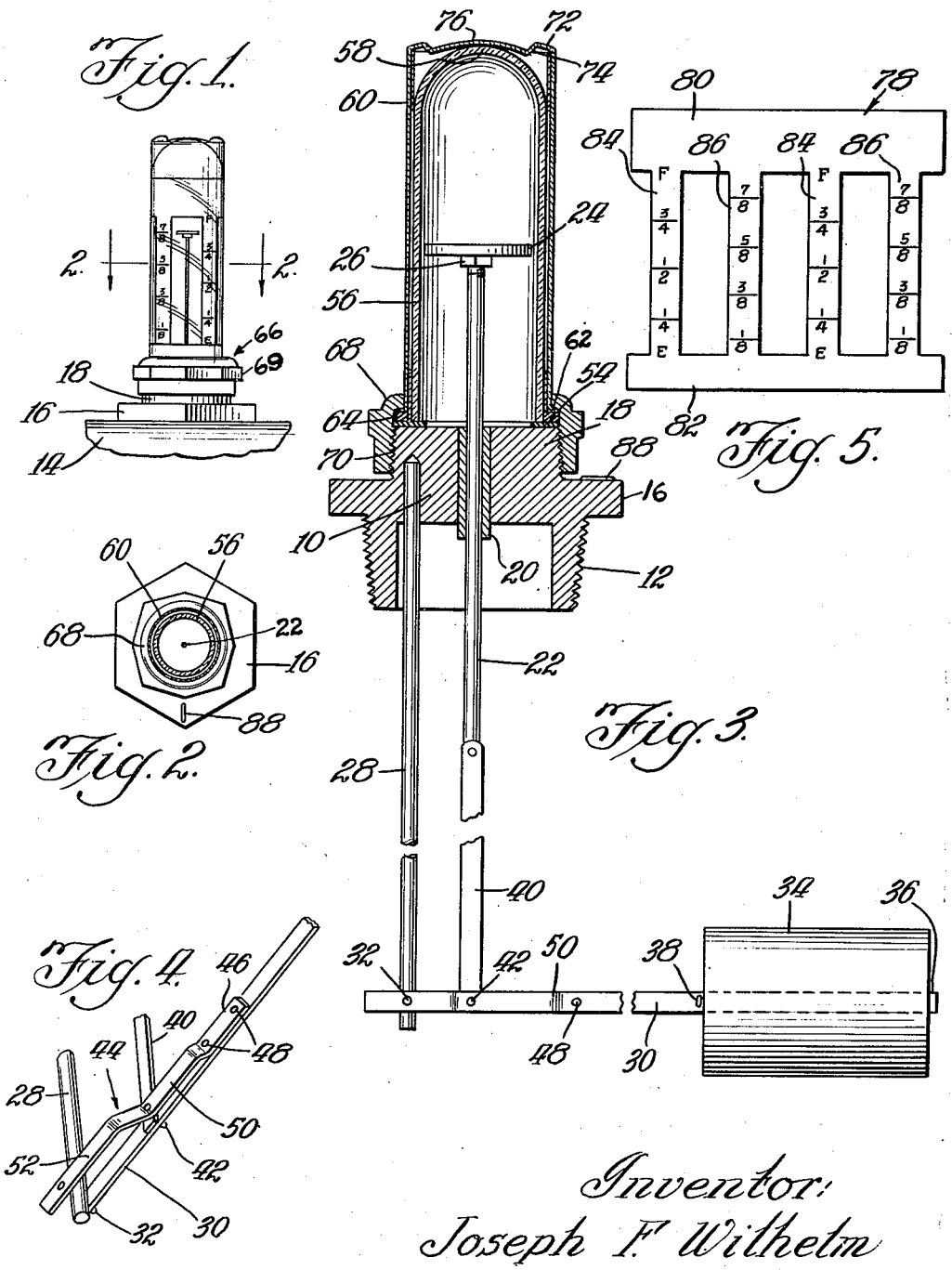
Inventor:
Joseph F. Wilhelm
By: Freeman, Sweet and Albrecht
Attys.

Patented Apr. 13, 1943

2,316,377

UNITED STATES PATENT OFFICE 2,316,377

TANK GAUGE

Joseph F. Wilhelm, Madison, Wis.

Application October 10, 1940, Serial No. 360,644

8 Claims. (Cl. 73—317)

My invention relates to tank gauges and includes among its objects and advantages an increase in durability and reliability in the type of gauge commonly used to indicate the amount of fuel in liquid fuel tanks for domestic heating plants. Incidental objects are improved visibility and tight sealing characteristics, and further detailed features of advantage will become apparent as the description proceeds.

In the accompanying drawing:

Figure 1 is a side elevation of the exposed portion of a gauge mounted on a tank;

Figure 2 is a plan view of the parts shown in Figure 1;

Figure 3 is a central section of the entire gauge;

Figure 4 is a perspective view of the pivotal connections between the standard, the pitman, and the float arm; and Figure 5 is a diagram of the paper indicator insert.

In the embodiment of the invention selected for illustration, the closure 10 has a pipe threaded annular depending portion 12 adapted to thread into the usual opening provided in a fuel tank 14. Above the portion 12 the closure 10 is provided with a hexagonal nut portion 16, and above the nut portion is an upwardly extending boss or support 18. The closure 10 and support 18 are provided with a central vertical axial bore in which is positioned a brass liner 20. The vertically sliding indicator rod 22 slides in the liner 20, and at its upper end carries an indicator disk 24 which may be a disk of red casein. The upper end of the rod 22 is threaded and the nut 26 is threaded down on the rod far enough to permit the disk 24 to be threaded down against it with sufficient pressure to function as a lock nut and hold the parts permanently in place.

Rigidly mounted in the closure 10 at one side of the rod 22 is the downwardly extending standard 28. The float rod 30 is pivoted to the standard 28 by a pintle 32, and the outer end of the rod 30 carries a cork float 34 restrained from outward movement by turning over the projecting end 36 of the float arm 30 and from inward movement by a cotter pin at 38.

The indicator rod 22 is connected to the float arm 30 by the pitman 40 which has its upper end pivoted to the lower end of the rod 22, and its lower end pivoted to the float arm by a pintle 42, at a point spaced from the pintle 32. To prevent wobbling or binding because the arm 30 is offset laterally from the standard 28, I provide a steady brace 44 which includes a section 46 lying in contact with the float arm 30 and riveted to it at two points as indicated at 48 in Figure 4. The next section 50 of the steady brace is offset from the arm 30 by a distance slightly greater than the thickness of the pitman 40, and the end of the section 50 nearest the standard receives one end of the pintle 42. The last section 52 of the steady brace is further offset to provide clearance between itself and the arm 30 to receive the arm 28 so that the pintle 32 is also engaged at both ends. In the embodiment illustrated the float arm 30, pitman 40, and steady brace 44 are all rectangular metal members of identical cross section.

I have provided transparent housing and sealing means above the support 18 capable of remaining tight against the leakage of gases or liquids up to pressures substantially in excess of any to which the device will be subjected in the ordinary course of service. The annular supporting washer 54 is merely to secure a smoother and slightly less rigid contact surface than the upper face of the metallic support 18. The inner glass tube 56 has its circular lower edge pressed vertically down into abutment with the supporting washer 54, and its upper dome-shaped end 58 receives the thrust of the holding means for holding the inner tube in place. The outer tube 60 is of transparent plastic such as Lucite, Tennite, or the like. Its inner diameter is larger than the outer diameter of the tube 56 to provide an annular housing space for the indicia card of Figure 5.

At its lower end the tube 60 has an outwardly extending flange 62. The sealing gasket 64 is of Neoprene and is preferably of such initial dimensions that a very slight tension is necessary to slip it in place over the end of the tube 56. This sealing washer has its inner cylindrical surface abutting the tube 56, and its lower plane surface abutting on the supporting gasket 54, and its upper plane surface underlies the flange 62. The clamp nut 66 has an inner cylindrical surface abutting the outer cylindrical surface of the sealing gasket 64, and an inwardly extending flange 68 overlying the outwardly extending flange 62 of the outer tube 60. The clamp nut 66 has a polygonal outer portion 69 and a threaded lower sleeve 70 engaging the cooperating threads on the support 18 to draw the clamp nut down. When the clamp nut is drawn down, the sealing gasket 64 is compressed in such a way that the material of which it is composed tends to press strongly down on the supporting gasket 54 and also strongly inward against the tube 56, thus forming a gas tight seal.

The upper end of the tube 60 is closed and the wall forming this closed end extends inwardly at 72, then inwardly and downwardly at 74, and then inwardly to the center in the form of a dome 76 of materially less curvature than the dome 58. This reverse configuration of the top wall affords considerable resilience so that it is not difficult to design the parts with such relative dimensions that when the clamp nut 66 is pulled down tight, the dome 76 is pressing downward on the dome 58, with sufficient force to resist any fluid pressure to which the device may normally be subjected, but at the same time without any tendency to crack the inner tube. Commercial devices according to this disclosure are required by safety considerations to withstand internal pressures up to 25 pounds per square inch, and the commercial devices I have produced have been tested successfully up to pressures of 75 pounds per square inch, thus allowing an ample margin of safety.

Housed between the tubes 56 and 60 is the skeleton paper insert 78 made up of the upper band 80, the lower band 82, and four risers. The risers 84 will be on diametrically opposite sides of the tube 56 when the device is assembled and carry indicia positioned to register with the indicator 24 when the tank is empty or full and for three intermediate conditions—¼ full, ½ full, and ¾ full. The risers 86 alternate with the risers 84 and carry indicia that will register with the indicator 24 when the condition of the tank is ⅛ full, ⅜ full, ⅝ full and ⅞ full. A user looking at the gauge from any direction, can always see either one of the risers 84 or one of the risers 86, and in nearly all positions he can see two risers, as indicated in Figure 1.

To guide the operator making the installation, the body 10 is provided with indicating means in the form of a mark or boss 88 which is positioned in the same radial plane with respect to the vertical axis of the device as the float 34, so that the workman installing the device can screw the support home until the indicator 88 points in the direction in which the arm 30 should point to leave clearance inside the tank for proper movement of the float 34.

Without further elaboration the foregoing will so fully explain my invention that others may, by applying knowledge current at the time of application, readily adapt the same for use under various conditions of service.

I claim:

1. In a gauge for fuel oil tanks, in combination: a rigid downwardly extending standard; a horizontal pintle passing through said standard and extending beyond the same in both directions; a straight float arm pivoted on one end of said pintle; a float at the remote end of said float arm; a pitman having its lower end pivoted to said float arm at a point near to but spaced from said pintle; a steady brace of cross section duplicating the cross section of said float arm; said steady brace having a first portion lying against said float arm beyond said pitman pivot and riveted to said arm at a plurality of points, and a second portion offset from said float arm by more than the thickness of said pitman and extending past the pivoted lower end of said pitman; and a pintel passing through said float arm, pitman, and steady brace; said brace having a third portion extending past said standard on the side opposite said float arm and receiving one end of said first mentioned horizontal pintle.

2. In a tank gauge, in combination: a threaded closure member adapted to be threaded into a tank opening; a support extending upwardly above said closure member and integral with said closure member; said closure member and support having a central axial bore; a vertically slidable rod in said bore; an indicator member on said rod above said support; and housing and sealing means on said support, comprising: a supporting gasket overlying the top of said support; an innner transparent ceramic tube having a circular edge at its lower end resting directly on said gasket and a closed upper end dome; an outer transparent tube of plastic material telescoped over and radially spaced outside said inner tube; said outer tube having an outwardly extending flange at its lower end spaced from said supporting gasket; an annular sealing gasket; means for pressing said sealing gasket down against said supporting gasket and inwardly against said inner tube to form a seal; said outer tube having a closed upper end abutting the dome of said inner tube to hold said inner tube against vertical upward displacement.

3. In a tank gauge, in combination: a threaded closure member adapted to be threaded into a tank opening; a support extending upwardly above said closure member and integral with said closure member; said closure member and support having a central axial bore; a vertically slidable rod in said bore; an indicator member on said rod above said support; and housing and sealing means on said support, comprising: a supporting gasket overlying the top of said support; an inner transparent ceramic tube having a circular edge at its lower end resting directly on said gasket and a closed upper end dome; an outer transparent tube of plastic material telescoped over and radially spaced outside said inner tube; said outer tube having an outwardly extending flange at its lower end spaced from said supporting gasket; an annular sealing gasket; means for pressing said sealing gasket down against said supporting gasket and inwardly against said inner tube to form a seal; said outer tube having a closed upper end abutting the dome of said inner tube to hold said inner tube against vertical upward displacement; said outer tube upper end being formed with reversely corrugated wall portions which resiliently engage the dome of said inner tube; and a slotted paper sheet carrying indicia and housed between said tubes, whereby said indicator member can be see through the slots.

4. In a tank gauge, in combination: a threaded closure member adapted to be threaded into a tank opening; a support extending upwardly above said closure member and integral with said closure member; said closure member and support having a central axial bore; a vertically slidable rod in said bore; an indicator member on said rod above said support; and housing and sealing means on said support, comprising: a supporting gasket overlying the top of said support; an inner transparent ceramic tube having a circular edge at its lower end resting directly on said gasket and a closed upper end dome; an outer transparent tube of plastic material telescoped over said inner tube; said outer tube having an outwardly extending flange at its lower end spaced from said supporting gasket; an annular sealing gasket having its inner cylindrical surface in abutment with said inner tube, its lower plane surface in abutment with said support gasket, and its upper plane surface in abutment with said flange; an annular clamp nut including a portion having an inwardly facing cylindrical surface in abutment with the outer cylindrical surface of said sealing gasket, and an inwardly directed flange overlying the outwardly directed flange of said outer tube; and a connection between said clamp nut and said support for drawing said clamp nut down to press said sealing washer down against said supporting gasket and inwardly against said inner tube to form a seal.

5. A tank gauge comprising, in combination: a threaded closure member adapted to be threaded into a tank opening; a support extending upwardly above said closure member and integral with said closure member; said closure member and support having a central axial bore; a vertically slidable rod in said bore; an indicator member on said rod above said support; and housing and sealing means on said support, comprising: a supporting gasket overlying the top of said support; an inner transparent ceramic tube having a circular edge at its lower end resting directly on said gasket and a closed upper end dome; said closed upper end dome having substantially the shape of a hollow hemisphere; an outer transparent tube of plastic material telescoped over and radially spaced outside said inner tube; said outer tube having an outwardly extending flange at its lower end spaced from said supporting gasket; an annular sealing gasket of Neoprene, having its inner cylindrical surface in abutment with said inner tube, its lower plane surface in abutment with said supporting gasket, and its upper plane surface in abutment with said flange; an annular clamp nut including a portion having an inwardly facing cylindrical surface in abutment with the outer cylindrical surface of said sealing gasket, and an inwardly directed flange overlying the outwardly directed flange of said outer tube; a threaded connection between said clamp nut and said support for drawing said clamp nut down to press said sealing gasket down against said supporting gasket and inwardly against said inner tube to form a seal; said outer tube having a closed upper end abutting the dome of said inner tube to hold said inner tube against vertical upward displacement; said outer tube upper end being formed with reversely corrugated wall portions which resiliently engage the dome of said inner tube; and a slotted paper sheet carrying indicia and housed between said tubes, whereby said indicator member can be seen through the slots.

6. In a tank gauge, in combination: a closure member; a support extending upwardly above said closure member; said closure member and support having a central axial bore; a vertically slidable rod in said bore; an indicator member on said rod above said support; and housing and sealing means on said support, comprising: an inner transparent ceramic tube having a circular edge at its lower end resting directly on said support and a closed upper end dome; an outer transparent tube of plastic material telescoped over and radially spaced outside said inner tube; said outer tube having an outwardly extending flange at its lower end; an annular sealing gasket; and means for pressing said sealing gasket down against said support and inwardly against said inner tube to form a seal; said outer tube having a closed upper end abutting the dome of said inner tube to hold said inner tube against vertical upward displacement.

7. In a tank gauge, in combination: a closure member; a support extending upwardly above said closure member; said closure member and support having a central axial bore; a vertically slidable rod in said bore; an indicator member on said rod above said support; and housing and sealing means on said support, comprising: an inner transparent ceramic tube having a circular edge at its lower end resting directly on said support and a closed upper end dome; an outer transparent tube of plastic material telescoped over and radially spaced outside said inner tube; said outer tube having an outwardly extending flange at its lower end; an annular sealing gasket; and means for pressing said sealing gasket down against said support and inwardly against said inner tube to form a seal; said outer tube having a closed upper end abutting the dome of said inner tube to hold said inner tube against vertical upward displacement; said outer tube upper end being formed with reversely corrugated wall portions which resiliently engage the dome of said inner tube.

8. In a tank gauge, in combination: a closure member; a support extending upwardly above said closure member and integral with said closure member; said closure member and support having a bore; a vertically slidable rod in said bore; an indicator member on said rod above said support; and housing and sealing means on said support, comprising: an inner transparent ceramic tube; an outer transparent tube telescoped over and radially spaced outside said inner tube; and a slotted sheet carrying indicia and housed between said tubes, whereby said indicator member can be seen through the slots.

JOSEPH F. WILHELM.